United States Patent Office 2,821,467
Patented Jan. 28, 1958

2,821,467

2-(p-HALOPHENYL CARBAMYL)-CYCLOHEXANE CARBOXYLIC ACID HERBICIDES

Norman J. Lewis, Kirkwood, Mo., assignor to Monsanto Chemical Company, St. Louis, Mo., a corporation of Delaware No Drawing. Application December 28, 1955
Serial No. 555,788

12 Claims. (Cl. 71—2.6)

This invention relates to herbicidal compositions and methods for their use. More particularly, this invention relates to new active chemical compounds of general utility, which are near homologues of compounds of little or no activity.

It is the primary purpose of this invention to provide a new and useful class of general herbicides and methods for their use. A further purpose of the invention is to provide a class of new chemical compounds and methods for their preparation. Still further purposes of the invention will be apparent from the following disclosure.

In accordance with this invention it has been discovered that 2-(p-halophenyl carbamyl)-cyclohexane carboxylic acids and salts thereof having the structure

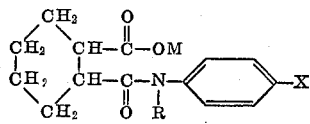

wherein X is a halogen atom, M is hydrogen or a salt forming radical including alkaline metal, ammonium or amino radicals and R is hydrogen or an alkyl radical; are useful herbicides.

Useful compounds included within the scope of this invention are those in which the halogen atom may be chlorine, bromine, iodine or fluorine, but best results are obtained from chlorine and bromine. For economic reasons and also because of superior herbicidal efficacy, the chlorine derivatives are of greatest importance.

Although acids are quite useful in the practice of the new methods of weed control and in the preparation of the new herbicidal compositions, the various salts of the alkaline metals, ammonia and the amines are similarly also new compounds capable of similar use. Typic salts are made by neutralizing the acid with alkali metal hydroxides, such as sodium hydroxide and potassium hydroxide; ammonium hydroxide; primary amines, such as methyl amine, butyl amine, aniline, cyclohexyl amine, tetradecyl amine, and benzyl amine; the secondary amine such as diethyl amine, N-methyl aniline, N-propyl benzyl amine, diphenyl amine, and dodecyl butyl amine; and the tertiary amine, for example triethanol amine, pyridine, tributyl amine, dimethyl dodecyl amine and N,N-diethyl phenyl amine. The preparations of these salts are procedures well known to the art, involving neutralization of acids with basic substances which reaction proceeds quite readily, as is well known to the art.

The compounds may be variable with respect to the R group which in the preferred modification is a hydrogen atom. However, it may be an alkyl radical if the compounds are derived from secondary amines, such as N-methyl p-chloroaniline, N-butyl p-bromoaniline, N-octyl p-iodoaniline or N-hexadecyl p-fluoroaniline, N-ethyl p-chloroaniline, N-amyl p-chloroaniline, N-n-propyl p-chloroaniline and N-isopropyl p-chloroaniline.

The new class of compounds is prepared by the reaction of hexahydrophthalic anhydride with p-haloaniline or an N-alkyl p-haloaniline. This reaction is preferably conducted in a solvent medium, for example an aromatic hydrocarbon, such as benzene or toluene, or an alcohol such as butanol or octanol, the solvent being chosen so as to provide temperature control for operation under reflux conditions. The reaction is conducted by adding the reagents gradually while subjecting the reaction mixture to temperatures from 25 to 150° C. The desired product is recovered from the solvent reaction medium by distillation or by fractional crystallization depending upon the choice of the solvent medium. By the proper selection of the solvent medium the product may be precipitated as a solid crystalline material and separated by filtration.

The alkali metal salts may similarly be recovered by conducting the reaction in the presence of a stoichiometric proportion of an alkali metal hydroxide. Alternatively the recovered acid may be converted to alkaline metal salt by a subsequent procedure involving the neutralization of the acid with a stoichiometric proportion of the alkali metal hydroxide.

Alternatively the acid may be neutralized with ammonium hydroxide or a primary, secondary or tertiary amine and the salt forming radical will be the ammonium radical, the amine radicals or the quaternary ammonium radicals depending upon the choice of the neutralizing agent. Here again the salt may be formed in the reaction mixture involved in the synthesis of the 2-(p-halophenyl carbamyl) cyclohexane carboxylic acid from p-haloaniline and hexahydrophthalic anhydride, or it may be synthesized by a subsequent chemical reaction.

Further details of the use and preparation of the compounds are set forth with respect to the following examples.

Example 1

A 200 ml. flask is charged with 30.8 g. of hexahydrophthalic anhydride and 50 ml. of butanol. The mixture is heated until a clear solution is formed. After filtering the solution, it is heated at the reflux temperature and a solution of 25.5 g. of p-chloroaniline in 30 ml. of butanol is gradually added. After heating the reaction mixture at reflux temperature for one hour the solvent is evaporated at reduced pressures, and a solid product is thereby crystallized. The product which is purified by recrystallization from ethanol is identified as 2-(p-chlorophenylcarbamyl)-cyclohexane carboxylic acid.

Example 2

The procedure of Example 1 is repeated except that p-bromo-aniline is used in place of p-chloroaniline. The product separated from the reaction mixture is identified as 2-(p-bromophenylcarbamyl)-cyclohexane carboxylic acid.

Example 3

A 1,000 ml. flask is charged with 30.8 g. of hexahydrophthalic anhydride and 20 ml. of dry benzene. The mixture is heated until a clear solution is produced. The flask is then charged gradually with 25.5 g. of p-chloroaniline dissolved in 200 ml. of dry benzene. The flask and its contents is stirred at 50° C. during the combination of reagents and for one hour after all of the reagents have been combined. Upon cooling the crystalline product is formed which is readily filtered. The product is recrystallized from ethanol and a 94% yield of a compound having a melting point of 180 to 181° C. is recovered. This compound is identified as 2-(p-chlorophenylcarbamyl) cyclohexane carboxylic acid.

The relative value of the herbicidal compounds was determined by planting in greenhouse flats seeds of seven different plants each representing a principal botanical type. The flats were treated with the herbicide at the rate equivalent to 5 lbs. per acre. In the following table of herbicidal evaluation data, these plants are represented by letters as follows:

A .................................... Brome grass.
B .................................... Rye.
C .................................... Buckwheat.
D .................................... Radish.
E .................................... Clover.
F .................................... Sugar beet.
G .................................... Cucumber.

The relative value of each compound with respect to its herbicidal effect on the various plants is indicated by a number as follows:

0 .................................... No phytotoxicity.
1 .................................... Slight phytotoxicity.
2 .................................... Moderate phytotoxicity.
3 .................................... Severe phytotoxicity.

The following table of observed data demonstrates phytotoxicity of the specified compound of the new class as well as the corresponding phytotoxicity of near isomers and homologues of the new compounds.

| | A | B | C | D | E | F | G |
|---|---|---|---|---|---|---|---|
| 2 - (p - chlorophenylcarbamyl) cyclohexane carboxylic acid | 3 | 3 | 2 | 3 | 3 | 3 | 3 |
| 2 - (o - chlorophenylcarbamyl) cyclohexane carboxylic acid | 0 | 0 | 0 | 0 | 0 | 0 | 0 |
| 2-(phenylcarbamyl) cyclohexane carboxylic acid | 0 | 0 | 0 | 0 | 0 | 0 | 0 |

Valuable herbicidal effects will be observed by applications of small amounts, for example, as low as 1 lb. of active component per acre as well as high concentrations, for example 100 lbs. per acre. For preferred general application and herbicidal effect on both the grasses and the dioctyledonous plants, 2 to 15 lbs. per acre is an effective treatment.

An important part of this invention is the formulation so as to permit a uniform predetermined application of herbicide to leaves or soil surfaces so as to produce the desired effect. By the proper selection and proportioning of the various conditioning agents either liquid or solid formulations can be prepared, and so as to adapt the herbicide for achieving the desired result with any conventional device for treating plant or soil surfaces.

The solid formulations, frequently referred to as "dusts" may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus hygroscopic materials are to be avoided unless the compositions also contain a separate substance to serve as an aid to the flowability. Effective solid diluents, preferably pulverulent or granular in form so as to be effective carriers for the active ingredient are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the said washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if it is mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. If the herbicides are soluble, mere dissolution in a suitable solvent will then provide a usable formulation. Often the herbicides are only limitedly soluble in water and therefore aqueous formulations will necessarily be dispersions of the water-insoluble substances in an aqueous medium. The water-insoluble substituted herbicides of this invention may first be dissolved in a suitable organic solvent and the organic solution of the active ingredient then incorporated in water or in any aqueous medium to produce a heterogenous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either in liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

What is claimed is:
1. A new compound having the structure

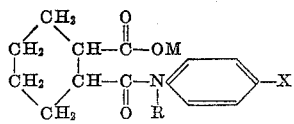

wherein M is selected from the group consisting of hydrogen, alkaline metal, ammonium and amino radicals, X is a halogen atom, and R is an alkyl radical.

2. A new compound having the structure

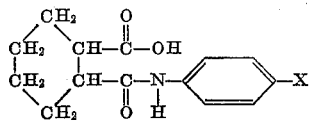

wherein X is a halogen atom.

3. A herbicidal composition containing as its active component a compound having the structure

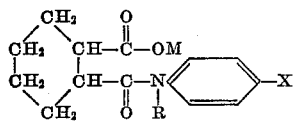

wherein M is selected from the group consisting of hydrogen, alkaline metal, ammonium and amino radicals, X is a halogen atom, and R is an alkyl radical.

4. A herbicidal composition containing as its active component a compound having the structure

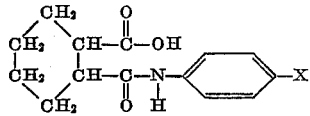

wherein X is a halogen atom.

5. A method of controlling the growth of weeds in agricultural soil which comprises treating the soil with from 2 to 15 pounds per acre of a compound having the structure

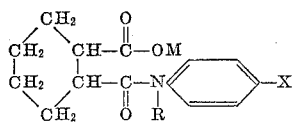

wherein M is selected from the group consisting of hydrogen, alkaline metal, ammonium and amino radicals, X is a halogen atom, and R is an alkyl radical.

6. A method of controlling the growth of weeds in agricultural soil which comprises treating the soil with from 2 to 15 pounds per acre of a compound having the structure

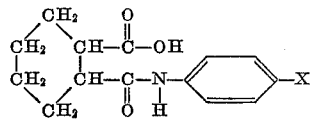

wherein X is a halogen atom.

7. The new compound 2-(p-chlorophenylcarbamyl)-cyclohexane carboxylic acid.

8. The new compound 2-(p-bromophenylcarbamyl)-cyclohexane carboxylic acid.

9. A herbicidal composition containing as its active component a compound 2-(p-chlorophenylcarbamyl)-cyclohexane carboxylic acid.

10. A herbicidal composition containing as its active component a compound 2-(p-bromophenylcarbamyl)-cyclohexane carboxylic acid.

11. A method of controlling the growth of weeds in agricultural soil which comprises treating the soil with from 2 to 15 pounds per acre of 2-(p-chlorophenylcarbamyl)-cyclohexane carboxylic acid.

12. A method of controlling the growth of weeds in agricultural soil which comprises treating the soil with from 2 to 15 pounds per acre of 2-(p-bromophenylcarbamyl)-cyclohexane carboxylic acid.

References Cited in the file of this patent

UNITED STATES PATENTS

| | | |
|---|---|---|
| 2,396,012 | Jones et al. | Mar. 5, 1946 |
| 2,527,322 | Morey | Oct. 24, 1950 |
| 2,556,665 | Smith et al. | June 12, 1951 |